United States Patent [19]

Kersey

[11] Patent Number: 4,897,543
[45] Date of Patent: Jan. 30, 1990

[54] APPARATUS AND METHOD FOR MINIMIZING POLARIZATION-INDUCED SIGNAL FADING IN AN INTERFEROMETRIC FIBER-OPTIC SENSOR USING INPUT-POLARIZATION CONTROL

[75] Inventor: Alan D. Kersey, Springfield, Va.

[73] Assignee: The United States of America as represented by the Secretary of the Navy, Washington, D.C.

[21] Appl. No.: 301,301

[22] Filed: Jan. 25, 1989

[51] Int. Cl.⁴ .............................................. H01V 5/16
[52] U.S. Cl. ................................... 250/227; 356/345
[58] Field of Search .................. 250/22 S, 227, 231 R, 250/20 S; 356/354, 359, 360, 345; 350/96.29

[56] References Cited

U.S. PATENT DOCUMENTS

| | | | |
|---|---|---|---|
| 4,530,603 | 7/1985 | Shaw et al. | 356/345 |
| 4,597,640 | 7/1986 | Buhrer | 350/405 |
| 4,653,915 | 3/1987 | Frigo et al. | 356/345 |
| 4,671,113 | 6/1987 | Carome | 250/227 |
| 4,729,622 | 3/1988 | Paviath | 350/96.15 |

OTHER PUBLICATIONS

"Remote Polarization Control For Fiber–Optic Interferometers", by K. H. Wanser et al., Optics Letters, vol. 12, No. 3, Mar. 1987, pp. 217-219.
"Dependence of Visibility on Input Polarization in Interferometric Fiber–Optic Sensors", by A. D. Kersey et al., Optics Letters, vol. 13, Apr. 1988, pp. 280-290.
"Optimization and Stabilization of Visibility in Interferometric Fiber–Optic Sensors Using Input–Polarization Control", by A. D. Kersey et al. Journal of Lightwave Technology, vol. 6, No. 10, Oct. 1988, pp. 1598-1609.

Primary Examiner—David C. Nelms
Attorney, Agent, or Firm—Thomas E. McDonnell; George Jameson

[57] ABSTRACT

An apparatus and method for minimizing polarization-induced signal fading in an interferometric fiber-optic sensor is disclosed. In a preferred embodiment of the invention, the polarization state of an input light beam is changed by a polarization controller as a function of first and second control signals applied to the controller. The input light beam with the changed polarization state is applied to the input of an interferometric fiber-optic sensor, causing the interferometric fiber-optic sensor to form an interference pattern at its output. This interference pattern is photodetected to develop an electrical signal that has a peak-to-peak amplitude proportional to the visibility of the interference pattern. A control circuit is responsive to the electrical signal for controllably developing the first and second control signals to change the polarization state of the input light beam to maximize the peak-to-peak amplitude of the electrical signal, thereby minimizing the polarization-induced signal fading in the interferometric fiber-optic sensor. The electrical signal is also demodulated to produce an output signal that is proportional to the field being sensed by the interferometric fiber-optic sensor.

17 Claims, 6 Drawing Sheets

APPARATUS AND METHOD FOR MINIMIZING POLARIZATION-INDUCED SIGNAL FADING IN AN INTERFEROMETRIC FIBER-OPTIC SENSOR USING INPUT-POLARIZATION CONTROL

BACKGROUND OF THE INVENTION

1. Field of the Invention

The present invention relates to polarization-induced signal fading in interferometric fiber-optic sensors and particularly to an apparatus and method for minimizing such polarization-induced signal fading in an interferometric fiber-optic sensor by controlling the state of polarization of the light input to the interferometer in such a sensor.

2. Description of the Prior Art

In recent years interferometric fiber-optic sensors have been configured to detect a wide range of physical fields, such as acoustic waves and temperature fluctuations. These sensors typically operate with high sensitivity, good linearity, and over a wide dynamic range.

In operation, an interferometric fiber-optic sensor combines the light beams from two optical paths (through signal and reference arms) in the interferometer of the sensor and causes them to interfere to produce an interference pattern that is proportional to the field being sensed by the sensor. The interference between the light beams from the two paths can fade due to polarization drifts. If the states of polarizations of the two interfering beams from the two arms of the interferometer are co-directional, the interference is at a maximum and the sensitivity of the sensor is greatest. However, if the states of polarizations of the beams from the two arms are orthogonal to each other, the light from the two arms do not interfere and the sensitivity of the sensor is zero. Usually, conventional low-birefringence single-mode optical fiber is used to construct interferometric sensors of the Mach-Zehnder and Michelson types. As a result, random fluctuations in the state of polarization (SOP) of the interfering beams guided in the nominally circular fiber core can lead to fading of the interference signal. This phenomenon, termed 'polarization - induced (signal) fading' is well know. It should be noted at this time that polarization-induced signal fading in interferometric fiber-optic sensors can occur due to two sources of polarization wandering-that in the actual arms of the sensor itself and that occuring in the input fiber to the sensor.

Several techniques have been proposed to overcame the effect of polarization-induced signal fading. These techniques range from the use of simple manual or automatic polarization controllers in the arms of the fiber interferometer, to techniques which can be described as polarization diversity detection schemes based on output polarization state selection.

In the case of manual or automatic polarization controllers, active polarization controllers, such as those based on fiber squeezers, Faraday rotators, or rotatable fiber wave plates developed for use in coherent communications systems, can be inserted into one or both of the fiber arms and used to match the SOP's of the interfering beams. This approach is well suited for use in laboratory sensor systems, but is not a practical solution for a prototype sensor, since such a sensor is usually required to operate passively and be remotely located from the source and detection/demodulation electronics.

In the case of polarization diversity detection, fading can be overcome by appropriately selecting a polarization mode at the output of the interferometer. This technique has been demonstrated using a passive three-axis polarizer mask at the interferometer output, and by effectively selecting the output polarization mode (general elliptical) using a fixed output polarizer and active birefringence manipulation in the output fiber lead.

Another technique is to construct the interferometer using high-birefringence (polarization preserving) fiber. However, due to the lack of high quality polarization preserving fiber components, notably directional couplers, this approach has met with little success.

OBJECTS OF THE INVENTION

Accordingly, it is an object of this invention to provide an improved apparatus and method therefor for minimizing polarization-induced signal fading in a two-beam interferometric fiber optic sensor.

Another object of this invention is to provide an apparatus and method therefor for minimizing polarization-induced signal fading in an interferometric fiber-optic sensor by controlling the state of polarization of the input light to the interferometer in such a sensor.

SUMMARY OF THE INVENTION

These and other objects of this invention are achieved by providing a method and an apparatus for minimizing polarization-induced signal fading in an interferometric fiber-optic sensor. The apparatus includes an optical source for providing an input light beam to a polarization controller. The polarization controller changes the polarization state of the input light beam as a function of first and second control signals applied thereto. The resultant input light with its changed polarization state is propagated to the input of an interferometric fiber-optic sensor, causing the interferometric fiber-optic sensor to form an interference pattern at its output. A phase carrier signal (optical source dither), applied by way of frequency modulation of the optical source for demodulation purposes, scans the intensity of the interference pattern through its maximum and minimum values. This interference pattern is detected by a photodetector to develop an electrical signal that has a peak-to-peak amplitude proportional to the intensity of the interference pattern. In response to the electrical signal a control circuit develops the first and second control signals to adjustably change the polarization state of the input light beam to maximize the peak-to-peak amplitude of the electrical signal, and thereby minimize the polarization-induced signal fading in the interferometric fiber-optic sensor. A demodulator also demodulates the electrical signal to produce an output signal that is proportional to the field being sensed by the interferometric fiber-optic sensor.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views, and wherein.

DETAILED DESCRIPTION OF THE PREFERRED EMBODIMENT

Before the structure and operation of the invention are discussed, the polarization properties of two-beam interferometers will be analyzed to better understand the concepts involved in the invention. Although a Mach-Zehnder interferometer will be discussed specifically in this analysis, it should be understood that such analysis is equally applicable to other two-beam interferometers, such as a Michelson interferometer.

Figure 1:
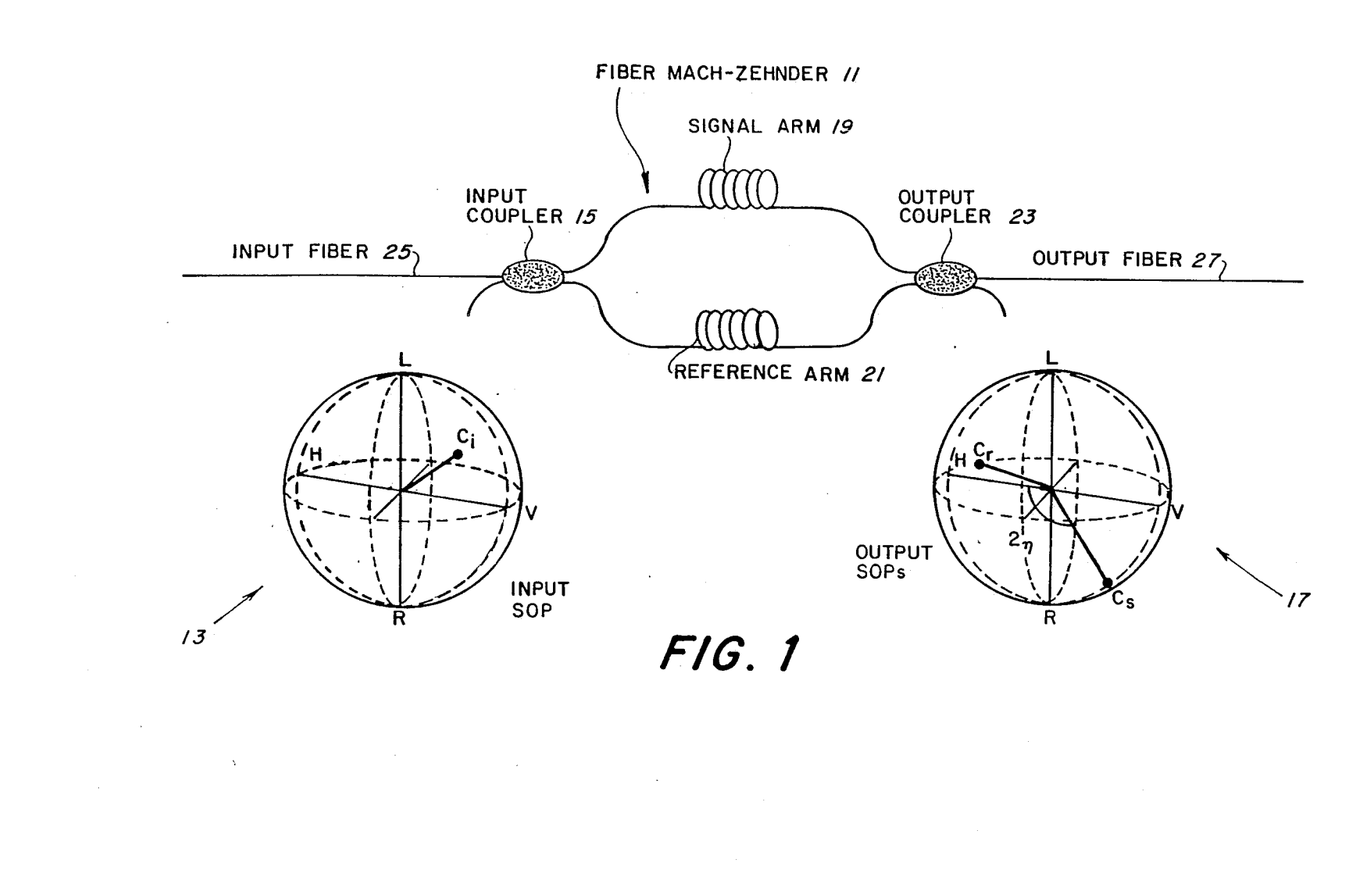
FIG. 1 illustrates a schematic of a Mach-Zehnder interferometer and the Poincare Sphere representations of the SOP's of the light at the first coupler ($C_i$), and in the signal ($C_s$) and reference ($C_r$) arms of the interferometer at the point of recombination in the output coupler.

Referring now to the Figures, FIG. 1 illustrates a fiber Mach-Zehnder interferometer 11, showing a Poincare Sphere representation 13 of the state of polarization or SOP (represented by $C_i$) of the light at an input coupler 15, and a Poincare Sphere representation 17 of the SOP's (represented by $C_s$ and $C_r$) of the signal light from a signal arm 19 and the reference light from a reference arm 21 at the point of recombination in an output coupler 23.

In the operation of the Mach-Zehnder interferometer 11, input light having the $C_i$ SOP is propagated in an optical input fiber 25 to the input coupler 15, which splits the light into two light beams. One beam passes through the signal arm 19 to produce signal light having the SOP $C_s$ at the output coupler 23. This arm is subjected to an external field (e.g., acoustic, magnetic), which changes the phase of the beam as a function of the physical parameter or external field being sensed. The other beam passes through the reference arm 21, which is isolated from any external perturbations, to produce the reference light having the SOP $C_r$ at the output coupler 23. If the states of polarization ($C_s$ and $C_r$) of the signal and reference beams are not orthogonal to each other, they will interfere with each other to cause an optical interference pattern to be produced at the output of the coupler 23. This interference pattern is then propagated through an optical output fiber 27 for further processing.

Assuming polarization insensitive 1:1 coupling in each of the couplers 15 and 23, the fringe visibility (or depth of modulation of the interference maxima and minima) is simply given by $$V = \cos \eta \quad (1)$$

where $2\eta$ is the angle subtended by the great circle arc $C_s - C_r$ at the center of the Poincare Sphere. The coordinates of $C_s$ and $C_r$ depend on the net polarization evolution along the signal and reference arms 19 and 21 and the input SOP $C_i$. Consequently, the visibility is dependent on both $C_i$ (which in turn depends on the birefringence in the input fiber 25) and the net SOP evolutions of the signal and reference light in the interferometer 11 itself caused by birefringence in the two fiber arms 19 and 21.

It is well known that the net birefringence in a length of optical fiber can be described by means of a general elliptic retarder denoted by an operator $R_j$ of rotational magnitude (phase delay) $\Omega_j$; and expressed as $R_j(\Omega_j)$ on a Poincare Sphere.

Figure 2A:
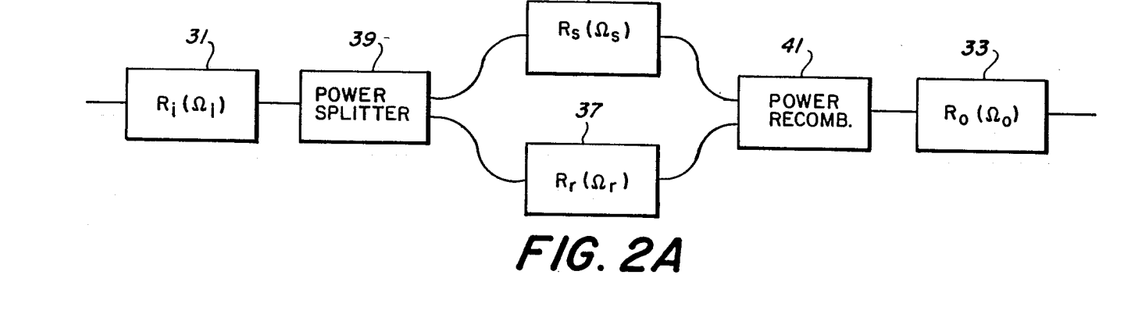
FIG. 2A shows a birefringent network used to model the interferometer of FIG. 1.
Figure 3A:
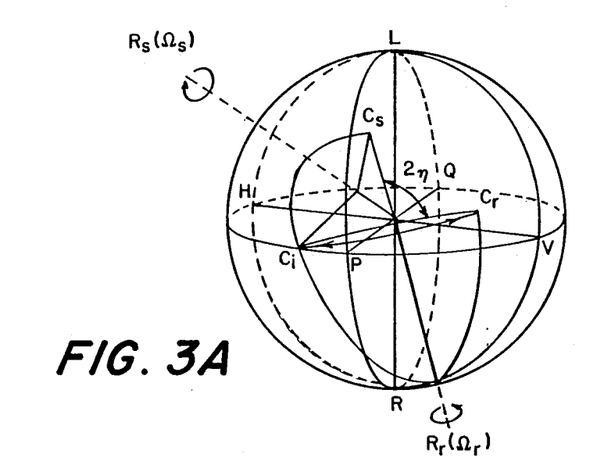
FIGS. 3A, 3B and 3C illustrate Poincare Sphere representations of relevant SOP's and operators useful in understanding the operational concepts of the birefringent networks of FIGS. 2A and 2B.

FIG. 2A shows a birefringent network used to model the interferometric system of FIG. 1. The birefringent network of FIG. 2A includes elliptic retarders 31, 33, 35 and 37 to respectively describe the net birefringence in the input and output fibers 25 and 27 and in the signal and reference arm fibers 19 and 21 of the interferometer 11 of FIG. 1. The couplers 15 and 23 of FIG. 1 are modeled in FIG. 2A as ideal 1:1 power splitters 39 and 41, with power splitter 41 operating as a power recombiner. The birefringence effects of the power splitter 39 and power combiner 41 are lumped into the four primary operators shown in retarders 31, 33, 35 and 37. The net evolution of the input polarization state $C_i$, along the signal and reference arms (19 and 21 of FIG. 1 and 35 and 37 of FIG. 2A) is thus described by Poincare Sphere operators $R_s(\Omega_s)$ and $R_r(\Omega_r)$, respectively. In general, these operators are not equal (i.e. $R_s \neq R_r$), and the input polarization state $C_i$(13, FIG. 1) is transformed into different output states $C_r$ and $C_s$(17, FIG. 1), as shown in FIG. 3A. It is important to note, however, that an input state $C_i$ coincident with the eigenmodes of $R_s$ or $R_r$ remains invariant in the net evolution of $C_i$ to $C_s$ or of $C_i$ to $C_r$, respectively (although not necessarily at all points along the signal or reference fibers).

Figure 2B:
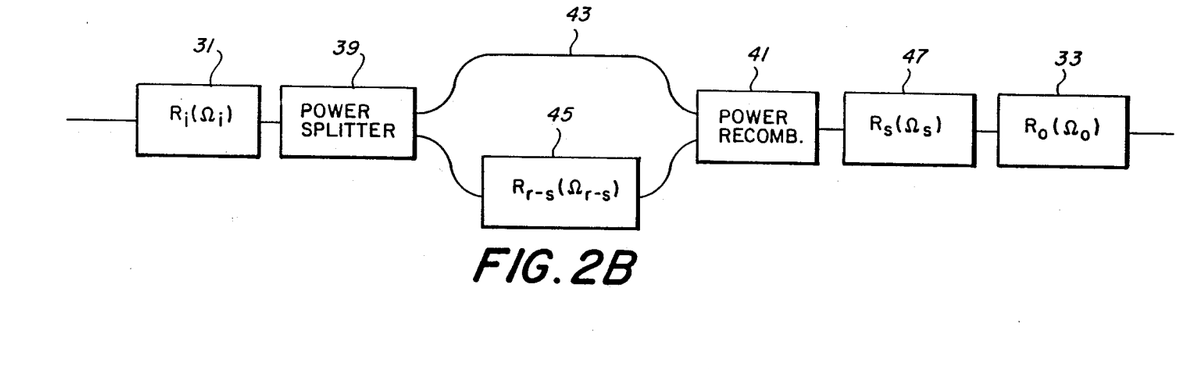
FIG. 2B shows a second equivalent birefringent network which can be used to model the interferometer of FIG. 1.

FIG. 2B shows a second equivalent birefringent network which can be used to model the interferometric system of FIG. 1. More specifically, FIG. 2B shows how FIG. 1 can be analyzed with just one birefringent operator representing the fiber arms. On the other hand, the birefringent network of FIG. 2A showed how to conventionally analyze FIG. 1 with a different birefringent operator representing each of the fiber signal and reference arms 19 and 21 of FIG. 1.

In the birefringent network of FIG. 2B, the interferometer output at the point of the recombination of the signal and reference light (the output of the power recombiner 41) is viewed in a frame of reference rotated by $R_s^{-1}$. As a result, an additional elliptic retarder 47 must be inserted between the power recombiner 41 and the elliptic retarder 33. In this new frame of reference the signal arm 43 appears isotropic (where the net operator $R_s^{-1} \cdot R_s = 1$), whereas the reference arm operator 45 is $R_{r-s}(\Omega_{r-s}) = R_s^{-1} \cdot R_r$. This operator is a unique parameter of the interferometric system which essentially describes the 'differential-birefringence' between the fiber arms (19 and 21 of FIG. 1), and can be used to analytically express the visibility of the interferometer 11 in terms of the input SOP $C_i$.

Figure 3B:
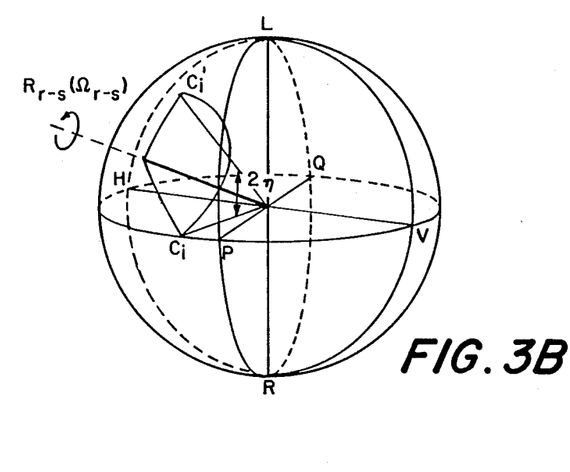
Figure 3C:
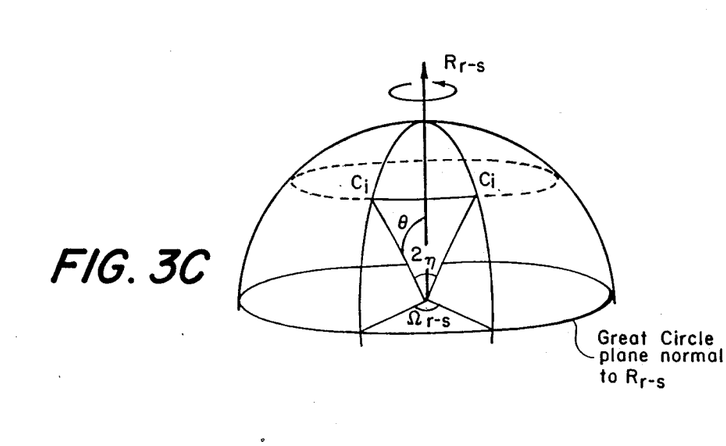

Referring now to FIGS. 3A, 3B and 3C, these figures illustrate Poincare Sphere representations of relevant SOP's and operators useful in understanding the operational concepts of the birefringent networks of FIGS. 2A and 2B. More specifically, FIG. 3A illustrates a Poincare Sphere representation of input and output SOP's for an arbitrarily chosen input SOP and elliptic retarders $R_r$ and $R_s$ in a fixed frame of reference (birefringent network of FIG. 2A). FIG. 3B illustrates a Poincare Sphere representation of input and output SOP's for an arbitrarily chosen input SOP and the differential elliptic retarder $R_{r-s}$ in the rotated output frame of reference. FIG. 3C more clearly illustrates the angular shift imparted in the input SOP ($C_i \to C_i'$) by the operator $R_{r-s}$.

Consider first the Poincare Sphere representation of the relevant SOP's and operators shown in FIGS. 3A and 3B. Operation on the input SOP $C_i$ by the operator $R_{r-s}(\Omega_{r-s})$ of FIG. 2B produce a polarization state $C_i'$, as shown in FIG. 3B. The relative separation of $C_i$ and $C_i'$ on the Poincare Sphere of FIG. 3B is identical to the relative separation between the SOP's $C_s$ and $C_r$ from the signal and reference arms (19 and 21 of FIG. 1) at the output of the interferometer (11) after separate operations by $R_s$ and $R_r$. These SOP's $C_s$ and $C_r$ are shown on the Poincare Sphere of FIG. 3A. The angular separation between two polarization states ($C_i$ and $C_i'$, or $C_s$ and $C_r$) is defined by the angle subtended at the center of the applicable Poincare Sphere by a great circle arc joining the two states.

Consequently, for an input polarization state coincident with the operator $R_{r-s}$, no angular shift will be imparted in $C_i$ and the output states $C_r$ and $C_s$ must be coincident, giving optimum visibility (i.e., unity for 1:1 power splitting in the couplers (15 and 23 of FIG. 1 or elements 39 and 41 in FIG. 2B)). Two input SOP's, one aligned with $R_{r-s}$ and the other diametrically opposite, thus exist which behave as eigenmodes of the interferometer for which optimum visibility can be achieved.

For an arbitrary input SOP $C_i$, the angular shift imparted to $C_i$ by $R_{r-s}$ is given by spherical geometry, as shown in FIG. 3C according to the equation $$2\eta = 2 \sin^{-1}(\sin\theta \cdot \sin(\Omega_{r-s}/2)) \quad (2)$$

where $\Omega_{s-r}$ is the rotation magnitude of $R_{r-s}$, and $\theta$ is the angle subtended by the great circle arc $C_i - R_{r-s}$ on the input Poincare Sphere. Using equation (1), the visibility can thus be expressed as $$V = \cos\eta = \{1 - \sin^2\theta \cdot \sin^2(\Omega_{r-s}/2)\}^{\frac{1}{2}} \quad (3)$$

clearly, this equation shows that if $|\Omega_{r-s}| < \pi$ (modulo $2\pi$), then $V > 0$ for all input SOP's, i.e., the visibility varies between the limits $V_{max} = 1$ and $V_{min} = \cos(\Omega_{r-s}/2)$, which occur when $\theta = 0$ and $\theta = \pi/2$ respectively.

In the above discussion of FIGS. 1, 2A, 2B, 3A, 3B and 3C, it has been shown that input-polarization eigenstates of the interferometer exist for which the optimum visibility can always be achieved. So by controlling the SOP of the light input to an interferometric system, the visibility can always be maintained at its maximum value. Another way of stating this is that the polarization state or SOP $C_i$ of the light to the input of a two-beam interferometer is controlled and adjusted to produce at the output of the interferometer light having two polarization states ($C_s$ and $C_r$), which are coincident (have the same SOP). These are the major concepts of the invention.

Figure 4:
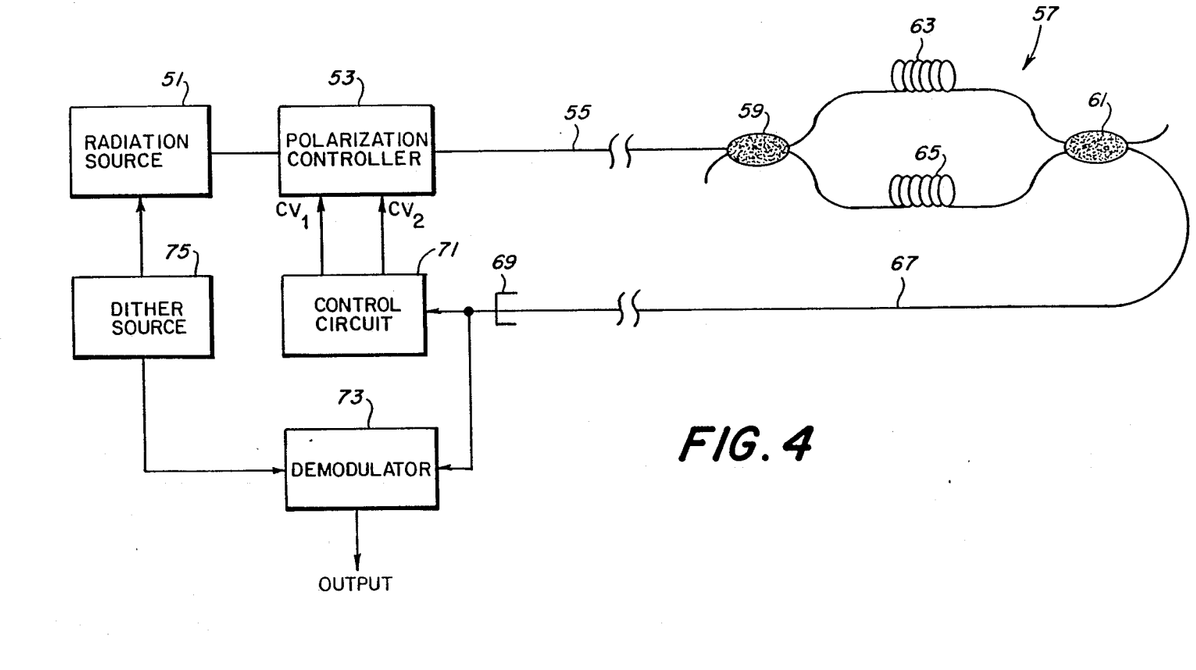
FIG. 4 illustrates a schematic block diagram of a preferred embodiment of the invention.

Referring now to FIG. 4, a schematic block diagram of a preferred embodiment of the invention will now be discussed.

A radiation source or laser 51 passes an input light beam through a polarization controller 53 and an input fiber 55 to an exemplary Mach-Zehnder interferometer 57. Although not shown, the radiation source 51 may include an isolator at its output to prevent light from being reflected back into the source 51. The polarization controller 53 is a device well known in the art and requires no further description. Basically, the polarization controller 53 changes the polarization state or SOP of the input light beam from source 51 as a function of control voltages $CV_1$ and $CV_2$ that are applied to the controller 53. Each of the control voltages $CV_1$ and $CV_2$ rotates the polarization state of the input light beam about an associated axis. As a result, the input polarization state can be rotated about two different axes to any polarization state on a Poincare Sphere.

The Mach=Zehnder interferometer 57 includes input and output couplers 59 and 61 and signal and reference arms 63 and 65 which respectively correspond in structure and operation to the input and output couplers 15 and 23 and signal and reference arms 19 and 21 of the interferometer 11 of FIG. 1.

The input light beam with the changed polarization state is split by the input coupler 59 into the signal and reference arms 63 and 65, respectively, and then recombined in the output coupler 61 to form an optical interference pattern at the output of the coupler 61. This optical interference patter is photodetected by a photodetector 69, which develops an electrical signal that has an amplitude proportional to the intensity of the optical interference pattern. The electrical signal is applied from photodetector 69 to control circuit 71 and demodulator 73.

A dither source 75 supplies an exemplary 40 kilo Hertz (KHz) dither signal to both the radiation source 51 and the demodulator 73. This dither signal causes the optical interference pattern to be swept over the light and dark fringes in the interference pattern at a 40 KHz rate, causing the optical changes in the interference pattern to vary in intensity between light and dark at the 40 HK rate. The electrical signal from photodetector 69 has a peak-to-peak amplitude that is proportional to the light intensity changes in the interference pattern and varies in amplitude at the 40 HKz rate.

The 40 KHz dither signal applied to the demodulator 73 mixes with the electrical signal to produce a demodulated output signal that is proportional to the field being sensed by the signal arm 63 of the interferometer 57.

The control circuit 71 is responsive to the peak-to-peak amplitude of the electrical signal for developing and selectively adjusting the amplitudes of the control signals $CV_1$ and $CV_2$ to maximize the peak-to-peak amplitude of the electrical signal from the photodetector 69. By maximizing the peak-to-peak amplitude of the electrical signal, the system of FIG. 4 minimizes the polarization-induced signal fading in the interferometric fiber optic sensor 57. It should be noted that the control circuit 71 completes a feedback loop between the output of the photodetector 69 and the polarization controller 53 to perform these operations.

Figure 5A:
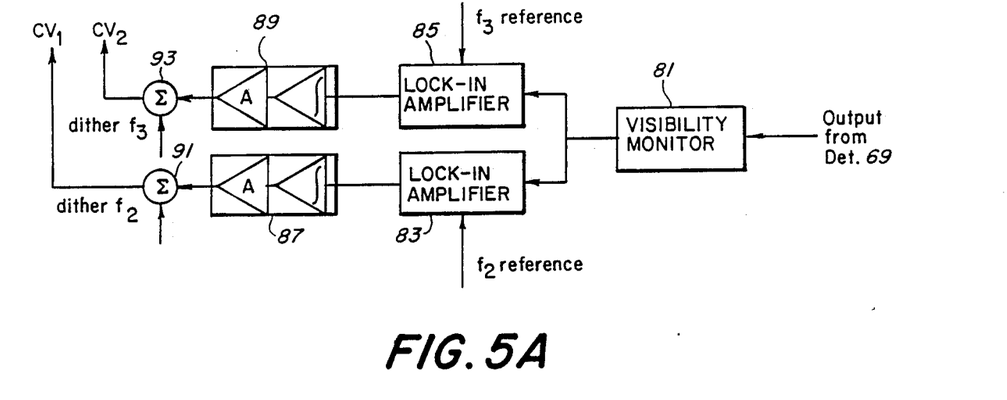
FIGS. 5A and 5B respectively illustrate two different implementations of the control circuit of FIG. 4.

Referring now to FIG. 5A, a first implementation of the control circuit 71 of FIG. 4 is shown. The electrical signal from photodetector 69 is applied to a visibility monitor or peak-to-peak detector 81 to detect peak-to-peak signal values. By dithering the $CV_1$ and $CV_2$ control voltages applied to the polarization controller 53 (FIG. 4) at different frequencies ($f_2$ and $f_3$), error voltages related to the polarization related to the polarization mismatch between the input polarization state $C_i$ and the eigenmode $R_{r-s}$ could be generated from the visibility monitor 81 and fed back to adjust $CV_1$ and $CV_2$ and thus control the SOP of the light at the input to the interferometer 57. This operation will be more fully described later. Referring again to FIG. 5A, the detected peak-to-peak signal values are applied to each of lock-in amplifiers or synchronous detectors 83 and 85, which are respectively dithered by reference frequencies $f_2$ and $f_3$. Exemplary frequencies for $f_2$ and $f_3$ are 120 Hz and 200 Hz.

Essentially, amplifier 83 mixes the reference frequency $f_2$ with the peak-to-peak signal values from the visibility monitor 81 to detect the modulation in the peak-to-peak signal values at the frequency $f_2$ induced by the dither $f_2$ applied to the control voltage $CV_1$ of polarization controller 53. Similarly, amplifier 85 mixes the reference frequency $f_3$ with the peak-to-peak signal values from the visibility monitor 81 to detect the modulation in the peak-to-peak signal values at the frequency $f_3$ induced by the dither $f_3$ applied to the control voltage $CV_2$ of the polarization controller 53.

Integrator-amplifier circuits 87 and 89 are respectively responsive to the modulation outputs from amplifiers 83 and 85 for respectively generating filtered and amplified voltages proportional to the amount of modulation in the outputs of amplifiers 83 and 85. Summers 91 and 93 respectively combine the dither frequencies $f_2$ and $f_3$ with the voltage outputs from integrator-amplifiers 87 and 89 to derive the control signals $CV_1$ and $CV_2$.

Figure 5B:
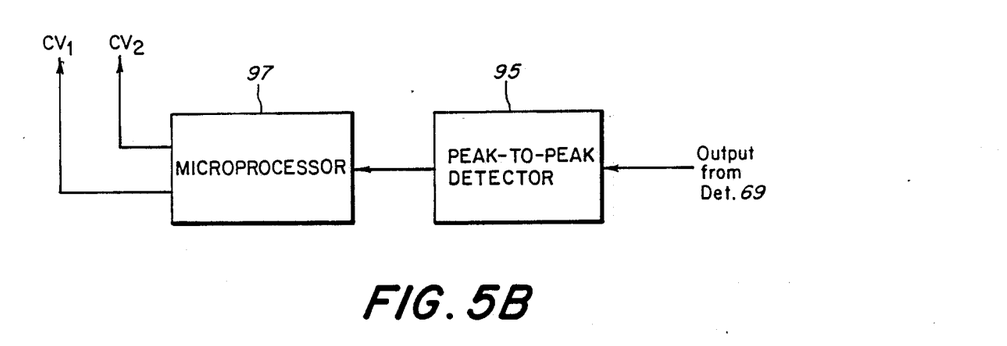

Referring now to FIG. 5B, a second implementation of the control circuit 71 of FIG. 4 is shown. The implementation of FIG. 5B is very simple, comprising only a peak-to-peak detector or visibility monitor 95 and a microprocessor, computer or computing device 97.

In response to the electrical signal from detector 69, the peak-to-peak detector 95 produces a minimum-maximum voltage that is proportional to the peak-to-peak amplitude of the electrical signal. In response to this minimum-maximum voltage the microprocessor 97 would operate according to an internally-stored routine or subroutine to sequentially adjust its $CV_1$ and $CV_2$ control voltage outputs to maximize the minimum-maximum voltage from detector 95. For example, the microprocessor 97 would operate to change $CV_1$ first. If the change in $CV_1$ causes the input voltage to the microprocessor 97 to increase, the microprocessor 97 would make another incremental change in the value of $CV_1$. If that change in $CV_1$ produces a decrease in the input voltage, the microprocessor 97 would reverse the direction of change in $CV_1$. Microprocessor 97 would continue to incrementally change the value of $CV_1$ until the minimum-maximum voltage range is maximized by adjusting $CV_1$. At that time, the microprocessor 97 would similarly incrementally adjust the value of the $CV_2$ control voltage until the minimum-maximum voltage at its input is maximized by adjusting $CV_2$. At that time the visibility would be at its maximum. The microprocessor 97 could then continue to adjust the values of $CV_1$ and $CV_2$ to maximize the visibility of the system. If so desired, the routine or subroutine of the microprocessor 97 could include another subroutine to impart individual dithering of the $CV_1$ and $CV_2$ control signals at desired dither frequencies.

Figure 6A:
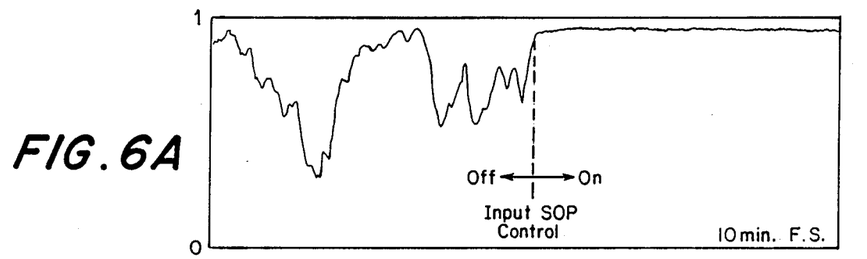
FIG. 6A, 6B, and 6C illustrate waveforms useful in explaining the operation of the visibility stabilization scheme of FIG. 4.
Figure 6B:
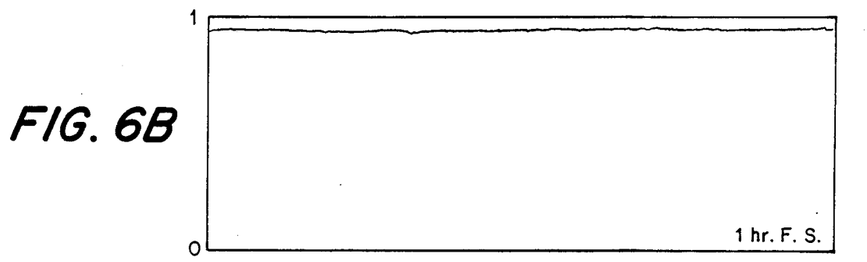
Figure 6C:
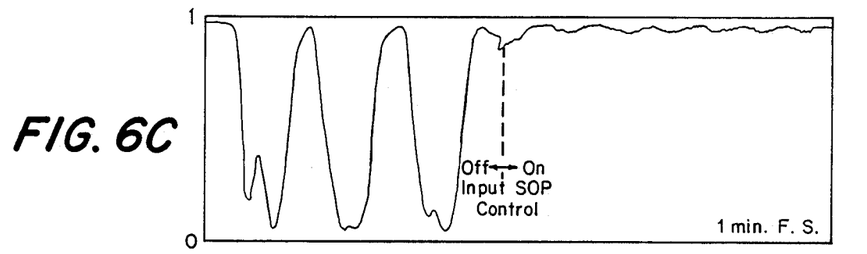

Referring now to FIGS. 6A, 6B and 6C, waveforms are illustrated showing the operation of the visibility stabilization 16 scheme of FIG. 4 using active input SOP control. FIG. 6A shows the variation in the output fringe visibility of the fiber Mach-Zehnder interferometer 57 (FIG. 4) due to input-fiber polarization wandering without active input SOP control for approximately the first 5 minutes and with active input SOP control for approximately the latter 5 minutes. FIG. 6B shows output fringe visibility stabilization over a one-hour period using feedback control of the input SOP. FIG. C shows the variation in output fringe visibility of the fiber Mach-Zehnder interferometer 57 (FIG. 4) due to direct manual adjustment of the birefringence in the arms 63 and 65 of the interferometer without feedback control of the input SOP for approximately the first 30 seconds and with feedback control of the input SOP for approximately the latter 30 seconds.

Therefore, what has been described is an apparatus and associated method for minimizing polarization—induced signal fading in an interferometric fiber—optic sensor by controlling the state of polarization of the light input to the interferometric system to maintain the visibility at its maximum value.

It should therefore readily be understood that many modifications and variations of the present invention are possible within the purview of the claimed invention. For example, the polarization controller 53 (FIG. 4) requires two control voltages, $CV_1$ and $CV_2$. Other polarization controllers, which require multiple control voltages, have also been reported in the art and could be used in this invention. It is therefore to be understood that within the scope of the appended claims, the invention may be practiced otherwise than as specifically described.

What is claimed and desired to be secured by Letters Patent of the United States is:

1. An apparatus for minimizing polarization-induced signal fading in an interferometric fiber-optic sensor, said apparatus comprising:

an optical source for providing an input light beam;

a polarization controller for changing the polarization state of said input light beam as a function of first and second control signals applied to said polarization controller;

means for conveying said input light beam with the changed polarization state to said interferometric fiber-optic sensor, said interferometric fiber-optic sensor being responsive to said input light beam with the changed polarization state for developing an interference pattern output;

photodetection means responsive to said interference pattern output for developing an electrical signal that has a peak-to-peak amplitude proportional to the visibility of said interference pattern output; and control means responsive to said electrical signal for controllably developing said first and second control signals to change the polarization state of said input light beam so as to maximize the peak-to-peak amplitude of said electrical signal and thereby minimize the polarization-induced signal fading in said interferometric fiber-optic sensor.

2. The apparatus of claim 1 wherein said photodetection means includes:

a photodetector for developing said electrical signal; and an output optical fiber for conveying said interference pattern output to said photodetector.

3. The apparatus of claim 1 wherein:
   said optical source is a laser.

4. The apparatus of claim 1 wherein said control means includes:

means for detecting the peak-to-peak amplitude of said electrical signal;

first and second means for respectively detecting first and second modulation components in the peak-to-peak amplitude output of said detecting means; and first and second conditioning means for respectively changing said first and second modulation components to said first and second control signals.

5. The apparatus of claim 4 wherein:
said detecting means is a peak-to-peak detector.

6. The apparatus of claim 4 wherein:
said conveying means is an optical fiber.

7. The apparatus of claim 7 wherein said photodetection means includes:
a photodetector for developing said electrical signal; and
an output optical fiber for conveying said interference pattern output to said photodetector.

8. The apparatus of claim 1 wherein said control means includes:
means for detecting the peak-to-peak amplitude of said electrical signal; and
processing means responsive to the peak-to-peak amplitude output of said detecting means for developing said first and second control signals.

9. The apparatus of claim 8 wherein:
said detecting means is a peak-to-peak detector.

10. The apparatus of claim 9 wherein:
said conveying means is an optical fiber.

11. The apparatus of claim 10 wherein said photodetection means includes:
a photodetector for developing said electrical signal; and
an output optical fiber for conveying said interference pattern output to said photodetector.

12. The apparatus of claim 1 further including:
means for demodulating said electrical signal to produce an output signal that is proportional to the field being sensed by said interferometric fiber-optic sensor; and
means for supplying a dither frequency to said optical source and to said demodulating means.

13. The apparatus of claim 1 wherein:
said conveying means is an optical fiber.

14. The apparatus of claim 13 wherein said photodetection means includes:
a photodetector for developing said electrical signal; and
an output optical fiber for conveying said interference pattern output to said photodetector.

15. A method for minimizing polarization-induced signal fading in an interferometric fiber-optic sensor, said method comprising the steps of:
changing the polarization state of an input light beam as a function of first and second control signals;
applying the input light beam with the changed polarization state to the input of an interferometric fiber-optic sensor;
forming an interference pattern at the output of an interferometric fiber-optic sensor in response to the application of the input light beam with the changed polarization state;
detecting the interference pattern output to develop an electrical signal that has a peak-to-peak amplitude proportional to the visibility of the interference pattern output;
using the electrical signal to controllably develop the first and second control signals to change the polarization state of the input light beam so as to maximize the peak-to-peak amplitude of the electrical signal in order to minimize the polarization-induced signal fading in the interferometric fiber-optic sensor.

16. The method of claim 15 further including the steps of:
demodulating the electrical signal to produce an output signal proportional to the field being sensed by the interferometric fiber-optic sensor; and
dithering the frequency of the input light beam and the frequency of the electrical signal being demodulated.

17. An apparatus for minimizing polarization-induced signal fading in an interferometric fiber-optic sensor, said apparatus comprising:
an optical source for providing an input light beam;
a polarization controller for changing the polarization state of said input light beam as a function of a plurality of control signals applied to said polarization controller;
means for conveying said input light beam with the changed polarization state to said interferometric fiber-optic sensor, said interferometric fiber-optic sensor being responsive to said input light beam with the changed polarization state for developing an interference pattern output;
photodetection means responsive to said interference pattern output for developing an electrical signal that has a peak-to-peak amplitude proportional to the visibility of said interference pattern output; and
control means responsive to said electrical signal for controllably developing said plurality of control signals to change the polarization state of said input light beam so as to maximize the peak-to-peak amplitude of said electrical signal and thereby minimize the polarization-induced signal fading in said interferometric fiber-optic sensor.

* * * * *